United States Patent
Pedriali et al.

(10) Patent No.: US 11,958,557 B2
(45) Date of Patent: Apr. 16, 2024

(54) CONSTRUCTION VEHICLE, ESPECIALLY PAVER

(71) Applicant: BOMAG GMBH, Boppard (DE)

(72) Inventors: Maurizio Pedriali, Boppard (DE); Fabio Baldrati, Boppard (DE)

(73) Assignee: BOMAG GMBH, Boppard (DE)

( * ) Notice: Subject to any disclaimer, the term of this patent is extended or adjusted under 35 U.S.C. 154(b) by 726 days.

(21) Appl. No.: 17/044,900

(22) PCT Filed: May 24, 2019

(86) PCT No.: PCT/EP2019/000168
§ 371 (c)(1),
(2) Date: Oct. 2, 2020

(87) PCT Pub. No.: WO2019/223900
PCT Pub. Date: Nov. 28, 2019

(65) Prior Publication Data
US 2021/0146997 A1   May 20, 2021

(30) Foreign Application Priority Data
May 25, 2018 (EP) .................................. 18000476

(51) Int. Cl.
*B62D 7/16*    (2006.01)
*B62D 5/12*    (2006.01)
*B62D 7/20*    (2006.01)

(52) U.S. Cl.
CPC ............... *B62D 7/16* (2013.01); *B62D 5/12* (2013.01); *B60G 2200/44* (2013.01); *B62D 7/20* (2013.01); *F16C 2326/24* (2013.01)

(58) Field of Classification Search
CPC ............... B62D 5/12; B62D 7/16; B62D 7/20
See application file for complete search history.

(56) References Cited

U.S. PATENT DOCUMENTS 5,489,114 A * 2/1996 Ward .................. B66F 11/046
                                                                180/209
6,202,781 B1  3/2001 Ima
(Continued)

FOREIGN PATENT DOCUMENTS

CN    105059081    11/2015
DE    10138563     2/2003
(Continued)

OTHER PUBLICATIONS

International Search Report from corresponding PCT Appln. No. PCT/EP2019/000168, dated Sep. 19, 2019.
(Continued)

*Primary Examiner* — Tony H Winner
*Assistant Examiner* — Hosam Shabara
(74) *Attorney, Agent, or Firm* — Grossman, Tucker, Perreault & Pfleger, PLLC

(57) ABSTRACT

A construction machine, especially to a paver, comprising an engine, a machine frame, a pair of front wheels with at least one right-side front wheel and at least one left-side front wheel in the forward direction of the construction machine, each front wheel being steerable about a separate vertical steering axis, a steering structure connected to the front wheels for controlling and coordinating the steering movement of the front wheels about the vertical steering axes, the steering structure comprising a steering actuator mounted on the machine frame and comprising a driven control member that is linearly moveable in a horizontal plane and perpendicular to the forward direction along an adjustment axis in relation to the machine frame, the driven control member comprising link elements at each end on its right and left side with regard to the forward direction of the construction machine, wherein the link elements are part of link joints of (Continued)

steering linkages in functional connection with the front wheels for steering purposes.

13 Claims, 6 Drawing Sheets

(56) References Cited

U.S. PATENT DOCUMENTS

| | | | | |
|---|---|---|---|---|
| 7,025,168 | B2* | 4/2006 | Wigdahl | B62D 7/20 |
| | | | | 180/436 |
| 9,121,143 | B2 | 9/2015 | Hagen et al. | |
| 2010/0276901 | A1* | 11/2010 | Richardson | B60G 11/465 |
| | | | | 280/93.512 |
| 2018/0290488 | A1* | 10/2018 | Kaplan | B60B 35/003 |

FOREIGN PATENT DOCUMENTS

| | | |
|---|---|---|
| DE | 102013020901 | 6/2014 |
| WO | 2009/152371 | 12/2009 |

OTHER PUBLICATIONS

Written Opinion from corresponding PCT Appln. No. PCT/EP2019/000168, dated Sep. 19, 2019.

\* cited by examiner

CONSTRUCTION VEHICLE, ESPECIALLY PAVER

FILED

The invention pertains to a construction machine, especially a self-propelled construction machine such as a paver.

BACKGROUND

Generic construction machines comprise an engine, e.g., a diesel engine. The engine provides the energy that is necessary to move the self-propelled construction over the ground and, if available, to drive working implements such as, for example, tamper bars, electric generators, vibration exciters, etc. Often, the construction machine comprises one or more hydraulic pumps. In this case, the engine drives these pumps and the working implements are powered by hydraulic energy delivered by the hydraulic pumps. The basic structure of the generic construction machine is formed by a machine frame that acts as the main supporting structure of the construction machine. Furthermore, the construction machine comprises a pair of front wheels with at least one right-side front wheel and at least one left-side front wheel in the forward direction of the construction machine. The forward direction is the travelling direction of the construction machine in the direction of the front side of the construction machine. As is well known, the self-propelled construction machine is steerable, e.g., so as to allow the turning and/or maneuvering of the construction machine. For this purpose, each front wheel is steerable about a separate vertical steering axis. Thus, the steering axes of the at least two front wheels are parallel to each other, but not coaxial. The steering movement of the front wheels is achieved with a steering structure connected to the front wheels for controlling and coordinating the steering movement of the front wheels about the vertical steering axes. Controlling the steering movement means controlling the turning movement of the front wheels around their respective steering axis. Coordinating the steering movement means that the at least two front wheels are turned around their respective steering axes in a coordinated and controlled manner.

To facilitate the steering movement, the steering structure comprises a steering actuator. The steering actuator is powered, e.g., by electrical or hydraulic energy. The steering actuator is usually functionally connected to some kind of input device that transmits a steering command to the steering actuator. This input device may be a manual input device such as, for example, a steering wheel or a steering joystick, or an electronic control unit, e.g. as part of an automatic steering control unit, etc. It is important to note that the steering actuator is mounted on the machine frame. Thus, at least a part of the steering actuator, e.g., the cylinder of a hydraulic cylinder arrangement, is stationary relative to the machine frame. The steering actuator drives a control member, which is a further element of the steering structure. The control member is linearly moveable, especially within a determined range, along an adjustment axis. The adjustment axis extends in a horizontal plane and perpendicular to the forward direction of the construction machine. Furthermore, the driven control member comprises link elements and couplings at each end, i.e. respectively on its right and left side with regard to the forward direction of the construction machine. The link elements are part of link joints of steering linkages in functional connection with the front wheels for steering purposes. Functional connection means that, for example, rods or other mechanical transmission elements are present that transmit the linear movement of the control member into a turning movement of the front wheels. A construction machine of this kind is, for example, disclosed in DE10138563A1.

Generic construction machines are used in particular in road construction works during which so-called road finishers are used to construct asphalt highways. These construction machines are usually in and of themselves very heavy. Moreover, they are also equipped with large-volume containers for accommodating construction material so that the wheel axles must be able to bear heavy loads. It is thus known to equip these machines with so-called tandem axle units. Apart from absorbing ground irregularities, tandem axle units have the advantage that they allow for a displacement of the center of gravity of the machine and thus make it possible to alter the effective distribution of the machine load on its front and rear axles. For example, if the pendulum axle of the tandem axle unit forms the front axle of the vehicle and the remaining wheels are arranged on the rear axle—as is the case in a road finisher—it is possible to shift the center of gravity of the machine forward by raising the front wheels of the tandem axle unit and thereby effectively reduce the machine load on the rear axle. The possibility of changing the load distribution on the axles is particularly advantageous when these machines are being driven, since it makes it possible to comply with the maximum permitted axle loads on public highways. When used at a construction site, it can again be advantageous to place particularly heavy axle loads on the front or rear axles, for example, in order to increase the effectiveness of a screed plate disposed on a rear wheel. It is thus known that these construction machines can be equipped to run on steerable wheels or a combination of wheels and tracks. It is furthermore known to equip generic construction machines with so-called bogie or tandem or pendulum axle units. In the case of a tandem axle unit, two axles are mounted one behind the other on a suspended and pivoted twin axle carrier. In this way the wheels can absorb unevenness of the surface of the ground such that the unevenness has no influence on the chassis. Twin axle carriers thus provide a means of stabilizing the machine as it travels, while the absorbing action of each twin axle carrier is possible independently of that of any other twin axle carrier. This kind of front wheel arrangement is, for example, disclosed in WO2009/152371A2 and DE102013020901A1.

In order to allow for a precise and reliable maneuvering of these kinds of machines, it is important that the steering system is robust and reliable. It is thus an object of the invention to improve the steering of a generic construction machine.

SUMMARY

The main idea of the invention is that the link elements of the control member are rigidly connected with each other by a connecting/fastening element that is separate and independent from the control member and that the connecting/fastening element is part of an anti-rotation structure that inhibits a rotational movement of the link elements about the adjustment axis in relation to each other and to the machine frame and thus fixates the rotational position of the link elements about the adjustment axis in relation to the machine frame and to each other. Thus, together with the connecting/fastening element, the link elements form a rigid unit. The connecting/fastening element therefore prevents the link elements from changing their position in relation to each other, especially their linear spacing along the adjustment axis and their rotational position about the adjustment axis of the control member. Besides connecting the link elements with each other, the connecting/fastening element is simultaneously part of the so-called anti-rotation structure, i.e. a structure that secures the rotational position of the link elements about the adjustment axis of the control member by locking the rotational position of the connecting/fastening element. Thus, the anti-rotation structure with the connecting/fastening element ensures that the link elements are kept in the same rotational position about the adjustment axis, even if the link elements change their linear position along the adjustment axis. The effect of the connecting fastener and the anti-rotation structure is that the actuating force exerted by the steering actuator is distributed onto both link elements reliably in an almost equal proportion. Additionally and/or alternatively, the invention prevents the loosening and especially the unscrewing of the link elements from the control member. At the same time, the relative position of the link elements to the ground during travel or operation is maintained which is, for example, advantageous with regard to maintenance applications. The adjustment axis is defined as the center longitudinal axis of the control member in the direction of its adjustment movement in relation to the machine frame or an axis that runs parallel to this axis.

In a preferred embodiment of the invention, the steering actuator is a hydraulic cylinder. In this embodiment, the steering actuator is thus connected to a hydraulic steering circuit that is connected to a pressure source such as a hydraulic pump. It is further advantageous if the hydraulic cylinder is a double-acting hydraulic cylinder. A double-acting hydraulic cylinder comprises a piston surface area on both sides of the piston head within the cylinder. It is also advantageous, if the hydraulic cylinder is a single or double rod, double rod-end hydraulic cylinder with two rod-ends projecting from the cylinder part. Generally, it is advantageous if the cylinder barrel or body of the hydraulic cylinder is stationary relative to the machine frame and the control member is a cylinder piston with a left and a right cylinder rod end protruding from the cylinder piston. The cylinder piston is thus moveable along the adjustment axis relative to the machine frame. It is possible to mount the cylinder barrel on the machine frame directly. However, a preferred embodiment of the invention comprises a cylinder barrel mounting bracket that is attached to the outside of the cylinder barrel and to the machine frame.

A very robust and thus preferred anti-rotation structure comprises at least one form closure element that is stationary relative to the frame and that engages with a complementary form closure element that is stationary relative to the link elements. The complementary form closure element is preferably positioned at or within the connecting/fastening element, as will be explained further below. The form closure element and the complementary form closure element interact with each other in such a way that, in the form closure state, a relative pivot movement of the one element relative to the other element about the linear adjustment axis is blocked. The engagement of the form closure elements with each other allows for a mechanical form fit which is reliable and cost-efficient. The form closure element and the complementary form closure element, furthermore, preferably form a single-degree-of-freedom system, the degree of freedom extending at least within a certain range along the adjustment axis. Thus, according to this embodiment it is possible to alter the relative position of the form closure element in relation to the complementary form closure element within a certain range along the adjustment axis.

Preferably, the form closure element is connected, especially directly, to the steering actuator, especially to the cylinder barrel, or to the machine frame and the complementary form closure element is, especially directly, connected to at least one link element or to the connecting/fastening element or is constituted by the connecting element or vice versa. The form closure element and the complementary form closure element may be separate elements or may each be be formed as an integral part of the steering actuator, especially of the cylinder barrel, the machine frame, the link element and the connecting fastener, respectively. This way, it is possible to obtain a comparably compact steering structure and especially anti-rotation structure.

A particularly advantageous embodiment of the invention can be obtained by combining the transmission of the steering movement of the steering actuator with the anti-rotation function of the anti-rotation structure. This is, for example, achieved with an anti-rotation structure that comprises a linear guidance structure that permits linear movement of the connecting member in relation to at least a part of the steering actuator, which is stationary with regard to the machine frame. The linear guidance structure is responsible for a controlled, non-rotating and linear movement of the connecting member in relation to at least a part of the steering actuator that is stationary with regard to the machine frame. Such a guidance structure usually encompasses an elongated guiding element that extends along or in a direction at least parallel to the adjustment axis in a uniform or periodic manner.

It is possible to modify several details of the linear guidance structure of the anti-rotation structure. It is, for example, advantageous if the linear guidance structure comprises a guiding element that linearly extends in the direction of the adjustment axis of the control member, especially an elongated hole or a rail or a notch/channel or even combinations thereof. As an alternative to a uniform guiding element, periodically altering guiding elements may be used as well such as, for example, cograils. The latter have the advantage that it is simultaneously possible to use the guiding element to exert adjustment forces on the guiding element, especially as part of the connecting element. In this case, the steering actuator may, for example, comprise a geared wheel that engages with the cograil or a similar element. The extent of the extension of the guiding element may define the maximum range of possible relative movement of the connecting/fastening element with the link elements in relation to the machine frame. Additionally or alternatively, it is preferred if an engagement element protrudes in a radial direction of the adjustment axis that engages with the guiding element. Thus, the engagement element comprises an extension in a radial direction of the adjustment axis of the control member in the direction of the complementary engagement element. Such an engagement element is, for example, an engagement pin, an engagement protrusion or similar extending element. The engagement element may be a separate element or may be a part of the element from which it is extending.

If an engagement pin is used, it is preferred if the engagement pin comprises at least a stop element that overlaps with the guiding element at least partially in a direction perpendicular to the radial direction of the adjustment axis on one side of the guiding element so that it prevents a movement of the guiding element in relation to the engagement element in at least one radial direction. The stop element thus represents a mechanical stop or barrier that limits the relative movement of the guiding element in relation to the engagement pin in a direction transverse to the adjustment axis beyond a certain position. Additionally or alternatively, it is preferred if a (further) stop element overlaps with the guiding element at least partially in a direction perpendicular to the radial direction of the adjustment axis on the other side with respect to said one side of the guiding element so that it prevents a movement of the guiding element in relation to the engagement element in at least the other radial direction. The stop element thus represents a mechanical stop or barrier that limits the relative movement of the guiding element in relation to the engagement pin in a direction transverse to the adjustment axis beyond a certain position. If both stop elements are combined, the guiding element is advantageously positioned between the two stop elements and is thus sandwiched between the two stop elements. In this embodiment, the two stop elements are located in front of and behind the guiding element in a radial direction to the adjustment axis. In doing so, it is possible to define and secure the spacing of the connecting/fastening element and the steering actuator in a radial direction, especially along the whole adjustment range in the direction of the adjustment axis.

Especially in view of construction and maintenance, the engagement pin advantageously comprises a base pin with a head portion and a base portion, wherein the base portion is connected in a stationary manner in relation to either the machine frame or the connecting/fastening element, and wherein the head portion comprises the stop element. The stationary connection of the base pin may, for example, be achieved by welding or gluing. However, it is preferred if the base pin comprises an at least partially threaded shaft that can be screwed into a corresponding female thread, e.g., in the connecting/fastening element of the machine frame. Such engagement pins are comparably cheap and easy to assemble. Additionally or alternatively, the engagement pin can comprise a base pin with a head portion and a base portion, wherein the base portion is connected in a stationary manner in relation to either the machine frame or the connecting/fastening element and the head portion comprises an attachment portion for the attachment of an additional head pin, wherein the head pin is attached to the head portion, comprises a shaft portion that runs through the guiding element as well as a stop element on the side of the guiding element opposite the base pin. Again, the head pin may be attached to the base pin via welding, gluing, a screw coupling, etc. This particular embodiment is not only easy to install, but allows a double-side positioning of stop elements, especially if the base pin as well as the head pin each comprise a stop element as disclosed above.

As already stated, it is advantageous to combine the functional elements of the linear guidance structure with the functional elements of the anti-rotation structure. Here, it is preferred if the guiding element of the linear guidance structure is the form closure element of the anti-rotation structure and the engagement element of the linear guidance structure is the complementary form closure element of the anti-rotation structure.

Details of the connecting/fastening element can also be varied in order to obtain preferred embodiments of the invention. It is, for example, advantageous if the connecting/fastening element is a plate-like element which requires only a small amount of space. Plate-like is to be understood as flat and predominantly extending in one plane. Additionally or alternatively, the connecting/fastening element is a solid element formed from a single piece. With regard to the connection of the connecting/fastening element to the link elements, even though it is possible to connect these two elements with each other irreversibly, e.g., by gluing, clamping, welding, etc., it is preferred if the connecting/fastening element is attached to the link members in a detachable manner, especially via screw connections. If screw connections are used, it is further preferred if the screw connections are accessible from the underside of the construction machine so as to facilitate access and simplify maintenance work. The connecting/fastening element can advantageously extend in a direction parallel to the steering actuator and in the direction of the adjustment axis, this being its main direction of extension. With regard to its position, it is preferred if the connecting/fastening element is positioned in vertical direction, especially directly, below the steering actuator. This is an optimal arrangement for saving space. Finally, it is additionally or alternatively preferred if the link elements are forked joints and the connecting/fastening element is attached directly to these forked joints via a connecting bolt. Such fork joints are easy to obtain and, furthermore, ensure a reliable transfer of steering forces from the steering actuator in the direction to the respective wheels.

As already stated above, it is preferably if the link elements are forked joints that are fastened to the end of the left and right cylinder rod ends protruding from the cylinder piston and that the connecting/fastening element is attached directly to these forked joints. The connection of the forked joints is advantageously achieved with a screwed joint, the forked joints preferably comprising the internal, female thread and the rod ends comprising the external, male thread, although the reverse construction is possible as well. Furthermore, it is of course possible to revert to other types of connections, such as, for example, welding, gluing, or other types of form and/or press fit connections. As a further alternative, it is even possible to obtain the fork-rod-body from a single piece, for example by appropriate milling or the like.

To protect the steering system from damage resulting from ground obstacles, it is advantageous if a detachable ground protection shield is mounted on the frame below the steering actuator and/or below its link members that shields the steering actuator and/or its link members on the ground side. The shield member thus functions as a mechanical barrier to the ground surface. The shield member is, for example, made from sheet metal via cutting and/or bending operations. It is further preferred if the shield member is mounted on the machine frame in a stationary manner with regard to the machine frame.

For some kinds of construction machines, it is known to use so-called tandem axle arrangements, especially when a better weight distribution is desired. Such a construction machine is, for example, a wheeled paver. According to the present invention, it is thus preferred that the right-side front wheel and the left-side front wheel are each part of a tandem axle arrangement, each tandem axle arrangement especially comprising a tandem axle frame supporting a first and second left-side front wheel and a first and second right-side front wheel, wherein each tandem axle frame is connected to the frame of the machine via a horizontal tandem axle and each front wheel is steerable around an individual vertical steering axis. For this particular arrangement, it is further preferred that the first and the second left-side front wheels are connected with each other by means of a forced coupling comprising a steering rod and that the first and the second right-side front wheels are connected with each other by means of a forced coupling comprising a further steering rod and that the wheels on each side are mechanically arranged in series with regard to the transmittal of the steering forces exerted by the steering actuator via the respective steering rods. The forced coupling thus couples the first and second wheel of one side with each other so that a steering movement of one wheel necessarily leads to a steering movement of the other wheel in the same turning direction.

The above-described steering systems can be used for different kinds of construction machines. One particular kind of construction machine is a paver for asphalt paving operations. Such a paver comprises on its front side a hopper and on its rear side a screed.

BRIEF DESCRIPTION OF THE DRAWINGS

The invention is described in greater detail below with reference to the examples shown in the drawings, which show schematically.

DETAILED DESCRIPTION

For the sake of clarity, reference signs are not necessarily repeated in every figure. Furthermore, identical elements are indicated by the same reference signs.

Figure 1:
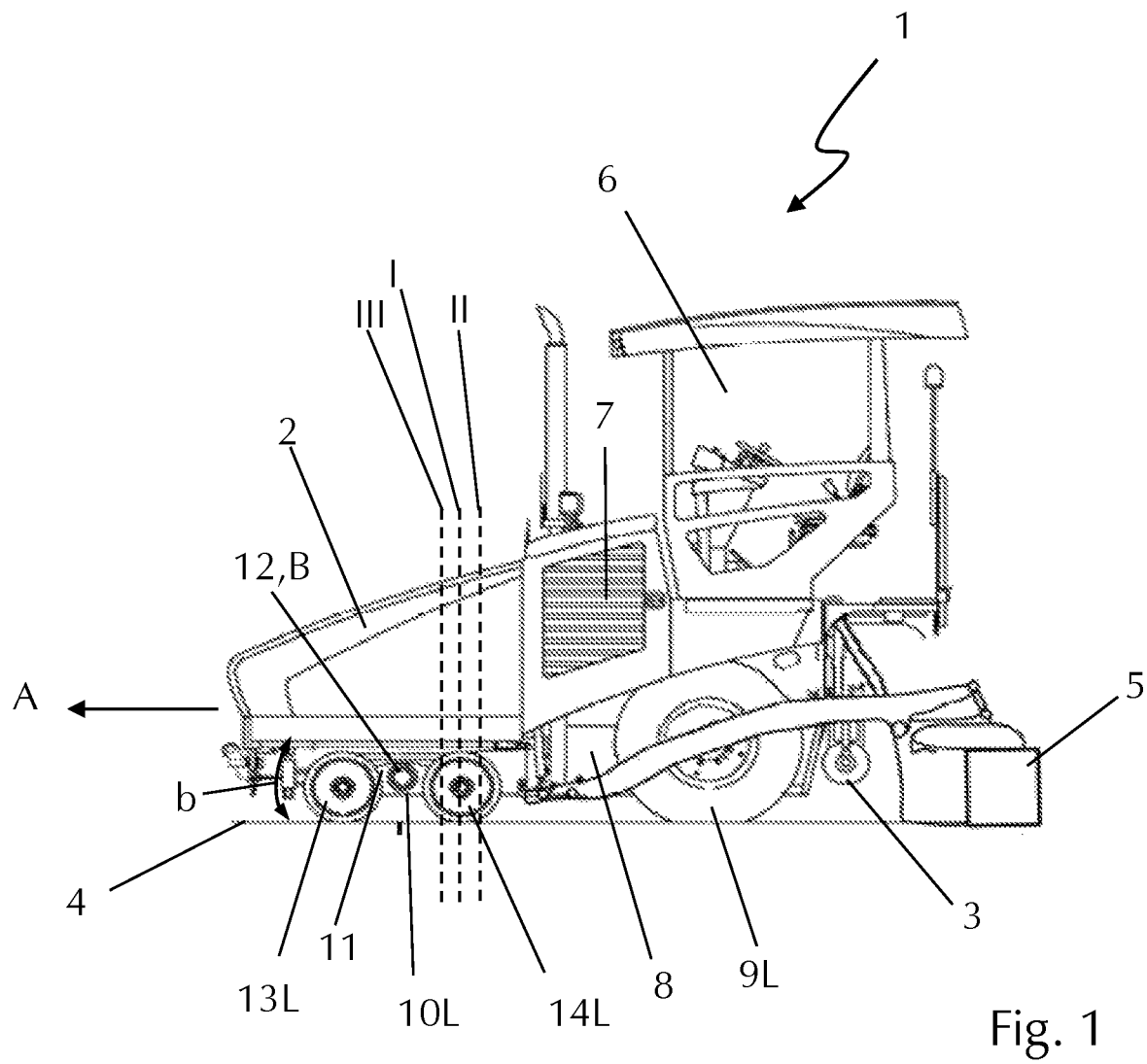
FIG. 1 is a side view of a generic construction machine, particularly a wheeled paver.
Figure 2:
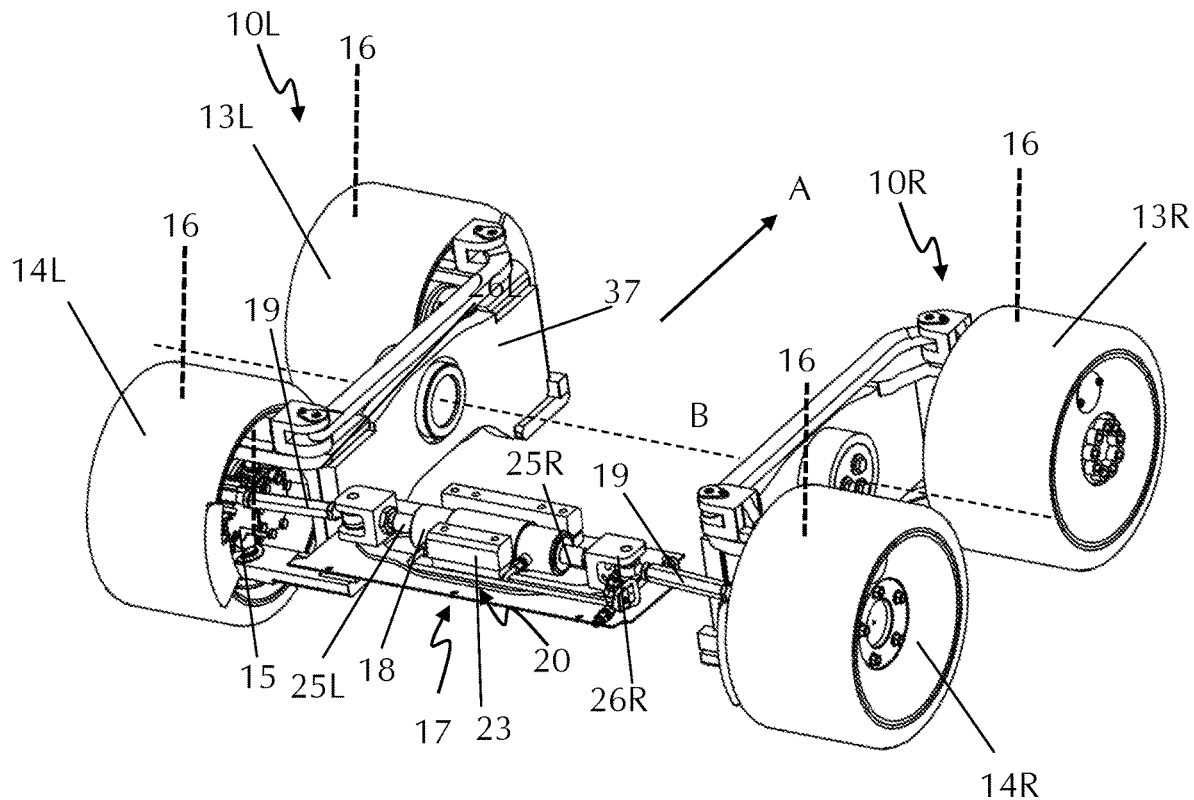
FIG. 2 is a perspective view from the rear right side of a front wheel tandem arrangement.
Figure 3:
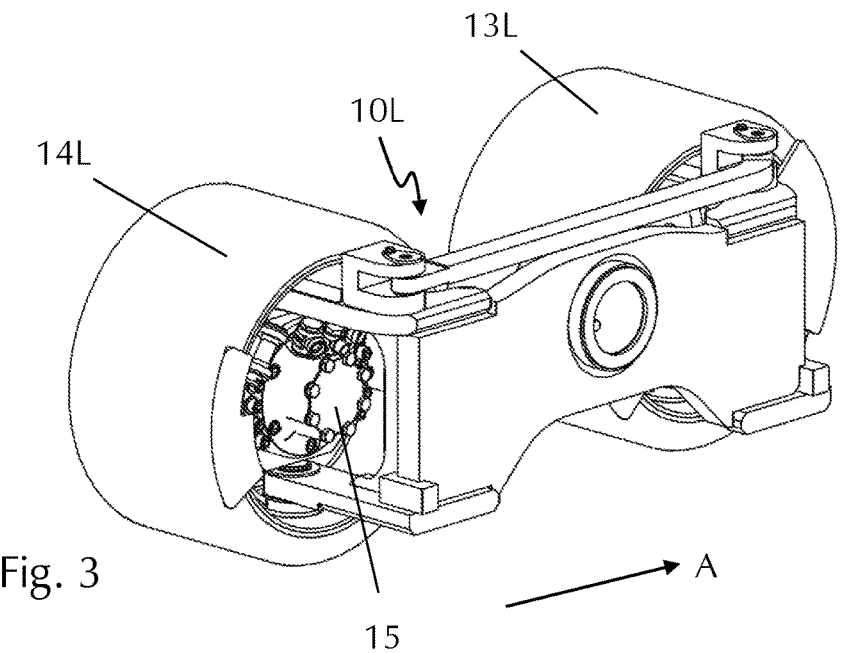
FIG. 3 is a perspective view of the left front wheel pair shown in FIG. 1 from the rear right.
Figure 4:
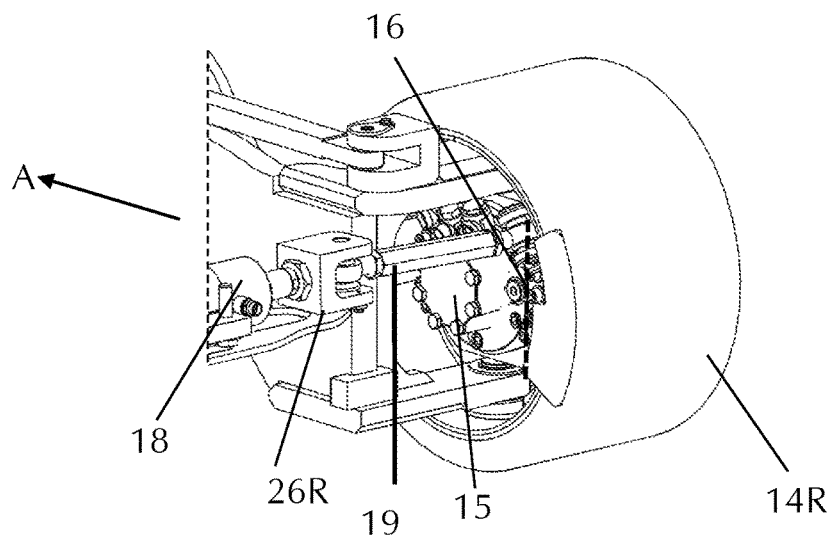
FIG. 4 is a perspective view of the first wheel of the front wheel tandem arrangement on the right side shown in FIG. 1 from the rear left side.

FIG. 1 shows a self-propelled construction machine 1. The construction machine in the present example is a paver. The arrow A indicates the forward direction of travel. The paver has at its front a material container and hopper 2, respectively, for accommodating construction material such as an asphalt mixture. At the rear, a device 3 for spreading the construction material transversely to the forward direction, such as distribution screws, is arranged. The construction material is spread on the ground surface 4 by means of the spreading device and then flattened by means of a screed plate 5. The operator's stand is designated by the reference numeral 6.

The construction machine 1 is generally self-propelled. For this purpose, the construction machine 1 comprises an engine 7, e.g., a diesel engine. The engine 7 produces the energy that is necessary to operate the construction machine 1. The engine 7 is positioned on a machine frame 8 that forms the main supporting structure of the construction machine 1. The engine 7 can, for example, drive one or more hydraulic pumps (not shown), e.g., via a pump transfer gear, that drive one or more hydraulic motors, actuators, etc.

Figure 5:
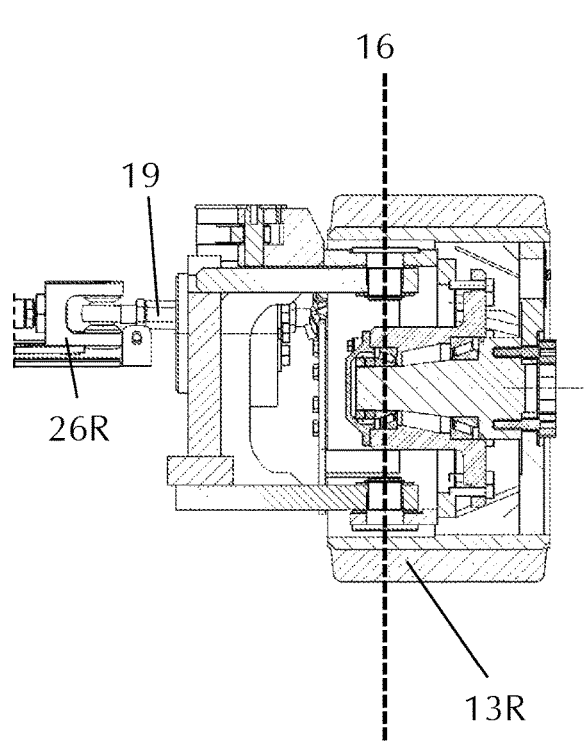
FIG. 5 is a perspective, vertical cross-sectional view of the wheel of FIG. 4 along the axis of rotation of the wheel (line I in FIG. 1)
Figure 6:
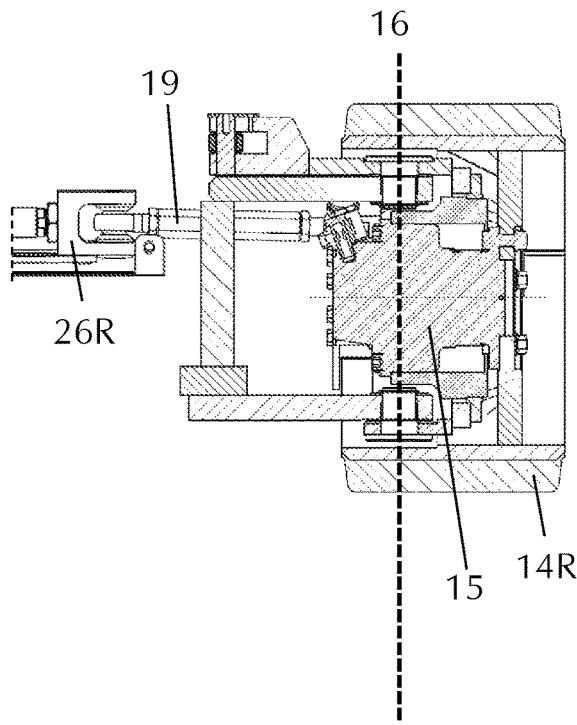
FIG. 6 is a plan view onto the vertical cross sectional view onto the wheel of FIG. 4 along the axis of rotation of the wheel (line I in FIG. 1)

The construction machine 1 has travel units in the form of a pair of rear wheels 9 and a pair of tandem axle units 10 arranged at the front, the side view in FIG. 1 showing only the left-hand rear wheel 9L and the left-hand tandem axle unit 10L. Thus, the further description of the travel units of the construction machine 1 according to FIG. 1 focuses on the travel units on the left side. However, the construction machine 1 of course comprises additional travel units on its right side, in fact the same elements as on the left side in an inverse arrangement with regard to the forward direction A. Both tandem axle units 10L and 10R constitute the tandem axle arrangement. This can be seen in the further FIGS. 3 to 13 for this particular embodiment. The tandem axle unit 10L arranged at the front of the road finisher 1, as regarded in the direction of travel A, comprises a tandem axle carrier or frame 11, which is mounted on the road finisher 1 by way of a pendulum axle 12, thus allowing a swivel movement of the tandem axle frame 11 in relation to the machine frame 8 within a certain range about pendulum axis B that is horizontal and perpendicular to the forward direction A (an example of the movement range is indicated in FIG. 1 with arrow b). The tandem axle frame 11 extends in the forward direction A and in the direction of the longitudinal axis of the construction machine 1. Travel units comprising a first front wheel 13 and a second ("rear") front wheel 14 (in the following, the adjunct "L" stands for "left side" and "R" for "right side) are arranged on the tandem axle frame 11 in the forward direction A of the construction machine 1 at a distance from each other. The wheels 13, 14 can comprise individual hydraulic hydromotors 15, suitable axle arrangements or other types of wheel supports as known in the prior art. The wheels, both or one of them, may as well be idler wheels (as is shown in FIG. 5 with respective shafts and bearings).

It is noted here that the construction machine in accordance with the invention does not have to comprise a tandem axle arrangement. The invention also pertains to travel unit arrangements with only one steerable front wheel on each side of the construction machine 1. In this arrangement, the construction machine would only comprise the front wheels 14L and 14R, while the front wheels 13L and 13R would be omitted. Furthermore, it is also possible to support or connect the front wheels via an axle arrangement directly to the machine frame. In this case, the tandem axle frame 11 and the pendulum axis would be omitted.

The front wheels 13 and 14 are steerable about individual vertical steering axes 16 via a steering system 17. In the following, the main components of the steering system 17, e.g. their respective functions and interrelationship, will be further explained on the basis of the illustrative embodiment of FIGS. 2 to 13.

The main components of the steering system and steering structure 17 are a steering actuator 18, steering linkages 19 and an anti-rotation structure 20.

The steering actuator 18 in the present example is a hydraulic cylinder 24 comprising a cylinder barrel 21 (FIG. 10) and a hydraulically driven control member 22 that is linearly moveable (FIGS. 10 and 12, arrow c) in relation to the cylinder barrel 21. The control member 22 is a double-acting, double-end cylinder piston rod, although other types of hydraulic cylinders and cylinder piston rods can be used as well. This is as such known in the prior art. The steering actuator 18 is mounted to the machine frame 8 with its cylinder barrel 21. Thus, the cylinder barrel 21 is stationary in relation to the machine frame 8 whereas the control member 22 is linearly moveable in relation to the machine frame 8 along axis c. The movement axis c runs in a horizontal plane and perpendicular to the forward direction A. For mounting purposes, the cylinder barrel 21 comprises mounting brackets 23 that are rigidly attached to the cylinder barrel 21 via respective screw connections, as is, for example, shown in FIGS. 8 and 9.

The solid (multi-part piston rods and control members are also possible) control member 22 protrudes from both sides of the cylinder barrel 23 with left and right cylinder rod ends 25R and 25L. Attached to the cylinder rod ends 25R and 25L are link elements of link joints that are part of a gearing mechanism that transfers the linear movement of the control member 22 to the wheels 13 and 14 to bring about the turning movement of the wheels 13, 14 about the vertical steering axes. In the present exemplary embodiment, the link elements are forked joints 26 with female threads that are screwed onto corresponding male threads positioned on the cylinder rod ends 25. Thus, the forked joints 26 move together with the control member 22.

This system—i.e. the entire mechanical system that is arranged between the control member 22 and the steerable wheels and that is responsible for the transmission of the steering forces created by a linear movement of the steering actuator 18 and leading to a swivel movement of the steerable wheels about their respective steering axes—is designated here as the steering structure 17. As is apparent from FIG. 2 to FIG. 12, the steering structure 17 comprises levers, steering arms, articulated joints, etc.

One important aspect of the present illustrative embodiment is the anti-rotation structure 20 that comprises a connecting/fastening element 27. The connecting/fastening element is rigidly attached to both link elements, which in turn are attached to the cylinder rod ends 25R and 25L, i.e. to the forked joints 26 in the present illustrative embodiment. However, the attachment of the connecting/fastening element to the link elements is separate from and external to the steering actuator 18 and the hydraulic cylinder 24, respectively. The connecting/fastening element 27 is furthermore not actively driven, but moved together with the link elements due to the rigid connection to the link elements. Thus, a movement of the connecting/fastening element 27 is indirectly driven by the steering actuator 18. The connecting/fastening element 27 thus facilitates a balanced distribution of the shifting forces brought about by the steering actuator 18 on both the link elements and the further steering linkages in the direction to the wheels. Furthermore, the connecting/fastening element 27 also functions as a tie rod element between the link elements by passing the control member 22.

Figure 11:
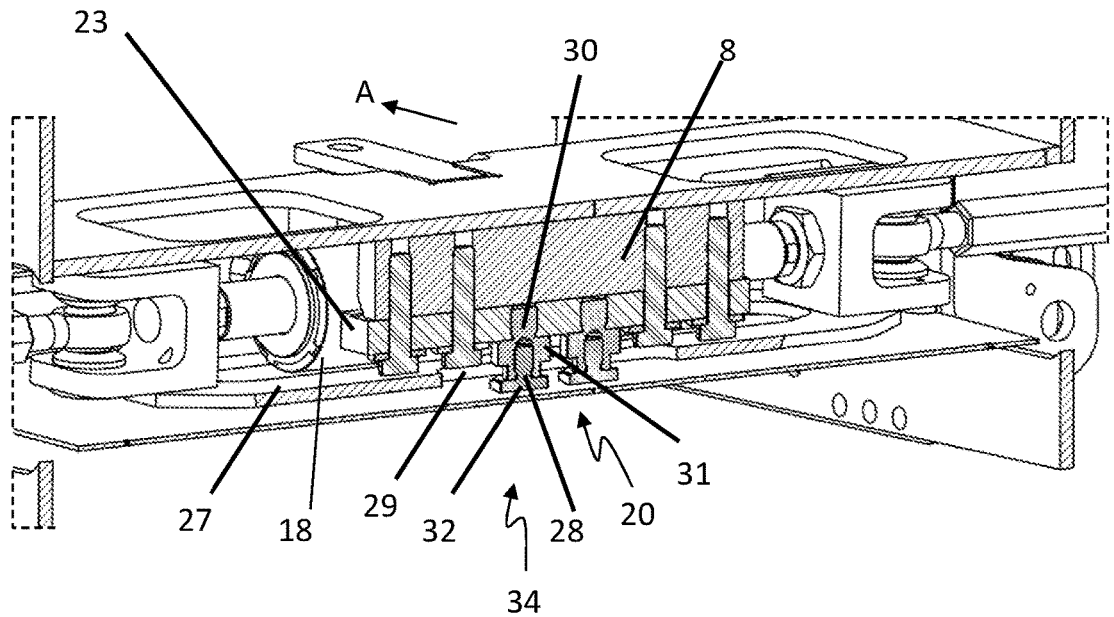
FIG. 11 is an enlarged view of the area I from FIG. 9 (line III in FIG. 1)
Figure 12:
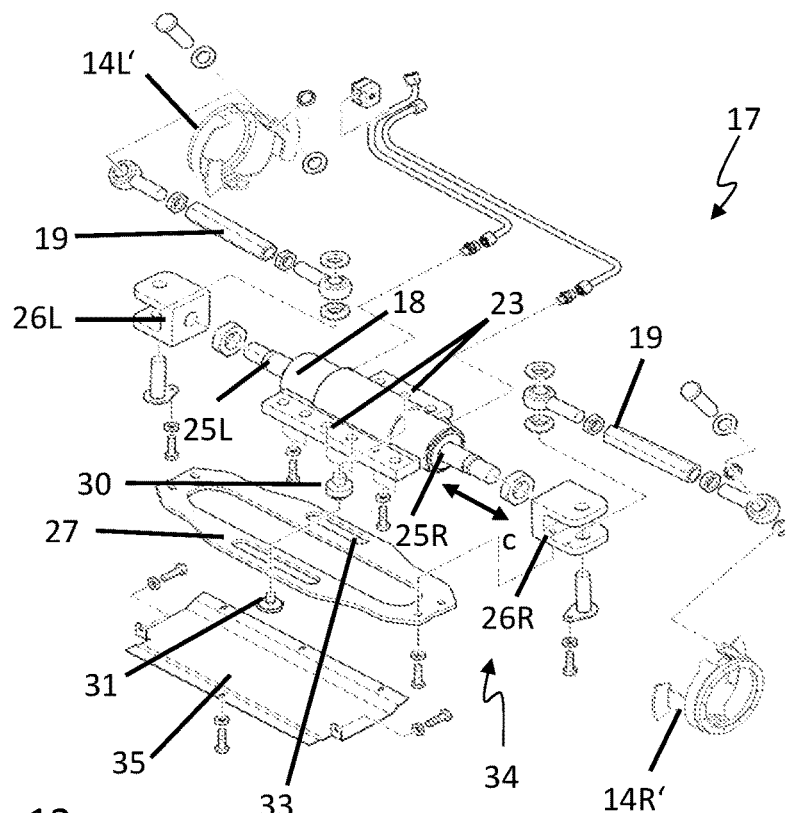
FIG. 12 is an exploded view of major components of the steering system.

The connecting/fastening element 27 is at the same time part of the anti-rotation structure 20. The anti-rotation structure 20 counteracts a relative turning movement of the machine frame 8 and stationary parts on the machine frame, such as, for example, the cylinder barrel 21, in relation to parts that are moveable along the adjustment axis C, such as the control member 20, the connecting/fastening element 27 and the link element, about the adjustment axis C. The adjustment axis C is especially defined as the axis of the maximum longitudinal extension of the control member along its linear movement direction in relation to the machine frame 8, as is especially indicated in FIG. 11. At the same time, the anti-rotation structure 20 enables a relative linear movement along the adjustment axis C of the machine frame 8 and stationary parts on the machine frame, such as, for example, the cylinder barrel 21, in relation to parts that are moveable along the adjustment axis C, such as the control member 20, the connecting/fastening element 27 and the link element. For this purpose, the anti-rotation structure 20 comprises a form closure system with a form closure element 28 that is attached to or that is at least stationary relative to the machine frame and a complementary form closure element 29 attached to a part that is moveable along the adjustment axis C, especially the connecting/fastening element 27. Details of this structure are visible especially in FIGS. 11 and 12 but as well in the other figures. The form closure element 28 comprises a base pin 30 and a head pin 31. The base pin 30 comprises at its base portion a threaded shaft portion that is screwed into a corresponding female thread portion in the machine frame 8, i.e. in the mounting bracket 23. Opposite the threaded shaft portion, the base pin comprises at its head portion a stop element 32, which is called "first stop element 32" in the following. Attached to the base pin 30 is a head pin 31 by means of a threaded shaft that is screwed into a female thread in the head portion of the base pin 30. Opposite the threaded shaft portion, the head pin 31 comprises at its head portion a stop element 32, called the "second stop element 32" in the following. The complementary form closure element 29 comprises an elongated, oblong hole 33 with its longitudinal axis extending parallel to the adjustment axis C. The oblong hole 33 is part of the connecting/fastening element 27. As is best seen in FIG. 11, the first stop element 31 and the second stop element 32 overlap with the hole 33 in a radial direction relative to the adjustment axis C on the near side (first stop element 31) and on the far side (second stop element 32) and thus sandwich the connecting/fastening element 27 in two radial directions. Thus, this particular arrangement blocks the movement of the connecting/fastening element 27 in relation to the motor frame 8 in a radial direction as well as in a pivot direction about the adjustment axis. At the same time, the hole 33 with the engaging shaft portion of the head pin 31 allows a guided linear movement of the connecting/fastening element 27 along the adjustment axis C in relation to the machine frame 8. Thus, the entirety of this engagement pin (base pin 30 and head pin 31) with this engagement element (connecting/fastening element 27 with the hole 33) forms a linear guidance structure 34 that guides a movement of the connecting/fastening element 27 and the forked joints 26 in relation to the machine frame 8 and stationary parts on the machine frame.

Figure 7:
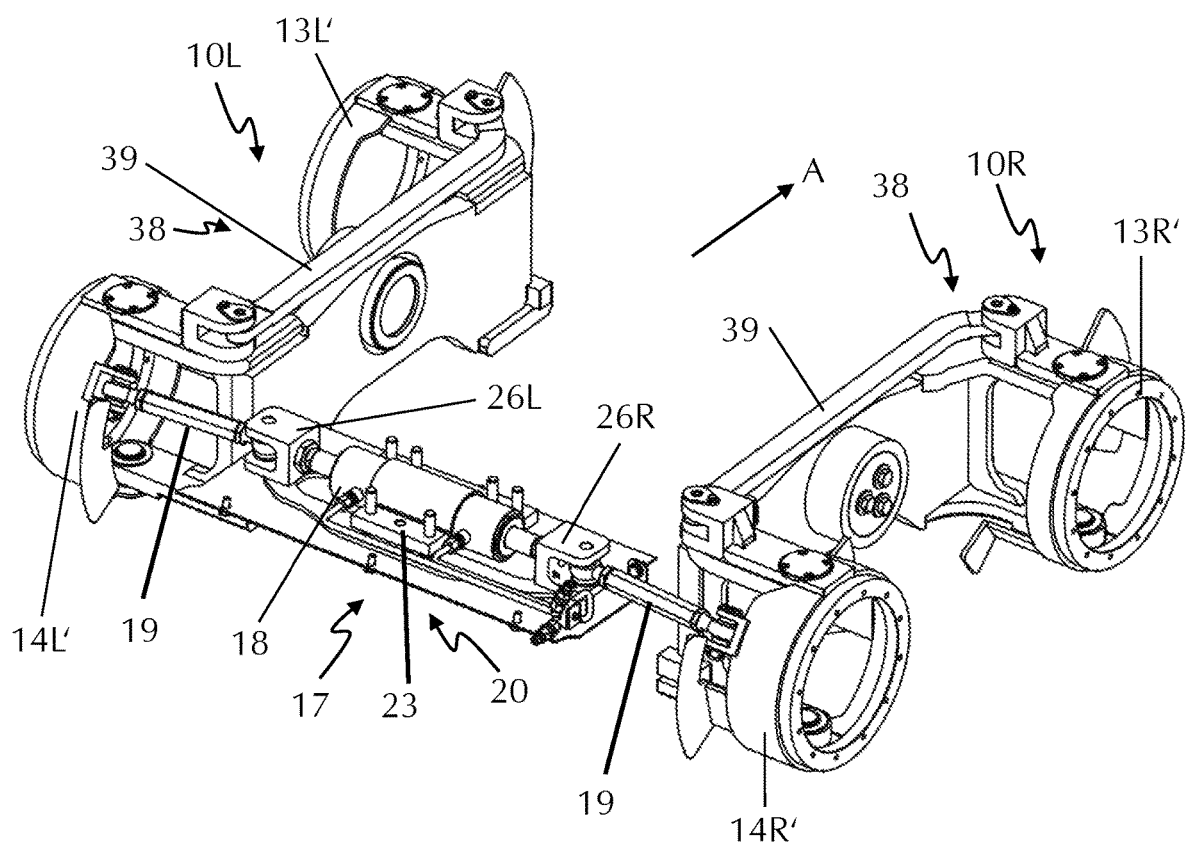
FIG. 7 is a perspective view, from the rear right, of the front wheel tandem arrangement of FIG. 1 with the wheels and parts of the machine frame detached.

As seen best in FIG. 7 and FIG. 11, the construction machine further comprises a ground protection shield 35 that is mounted to the machine frame 8 and covers at least the steering actuator 18, the forked joints 26 as well as the connecting/fastening element 27 in a vertical direction towards the underground. Thus, the protection shield 35 forms a mechanical protective shield structure designed to prevent that these elements of the steering system are damaged by ground obstacles.

Figure 8:
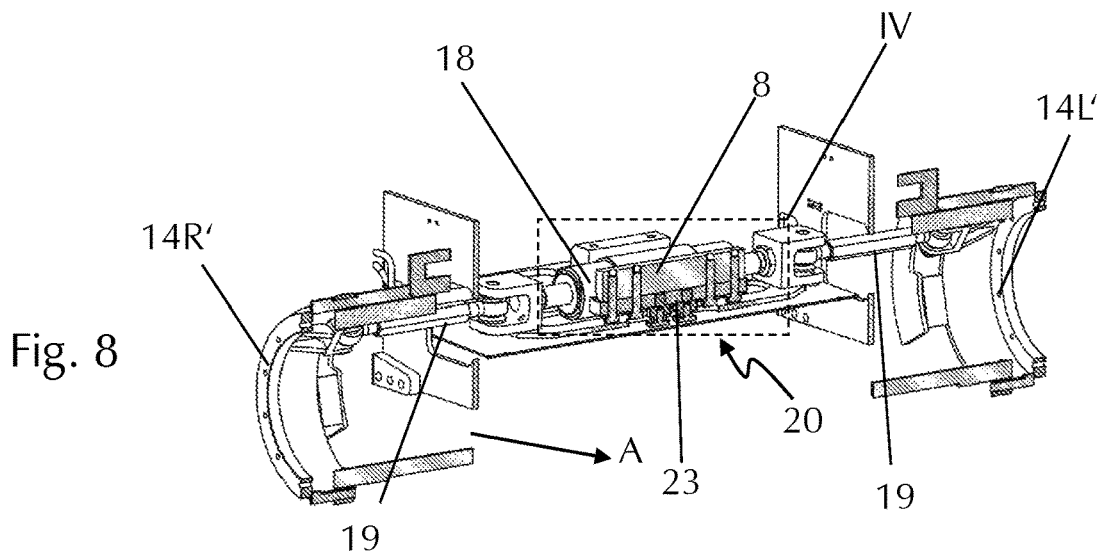
FIG. 8 is a perspective, vertical cross-sectional view parallel to the axis of rotation of the first right and left wheels from the front right side through a front mounting bracket (line III in FIG. 1)
Figure 9:
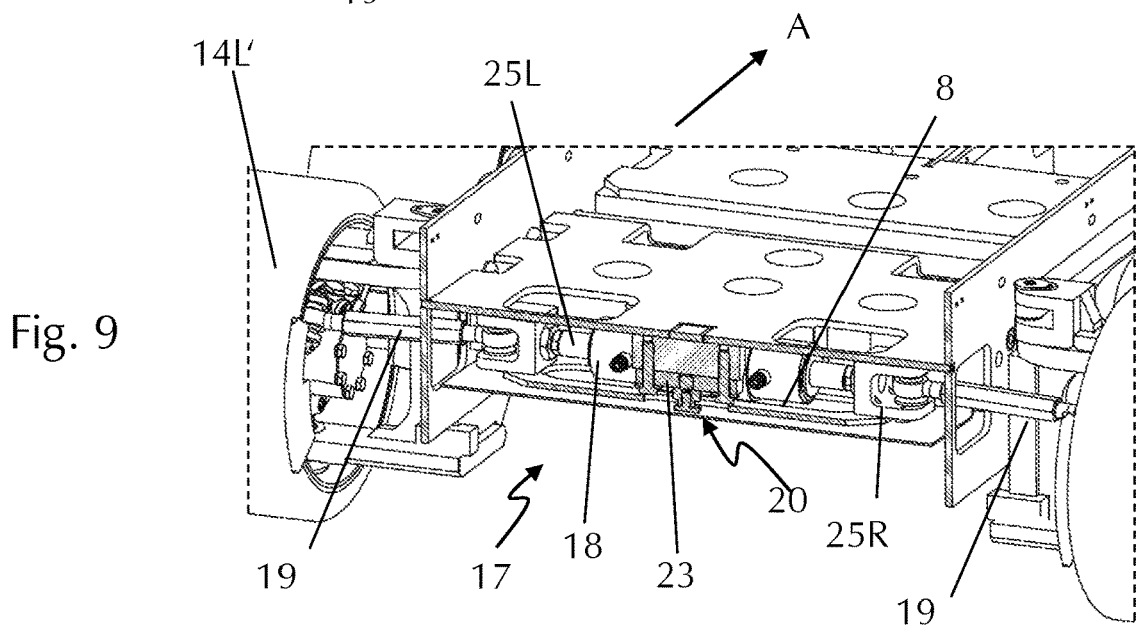
FIG. 9 is a perspective, vertical cross-sectional view parallel to the axis of rotation of the first right and left wheels from the rear right side through a rear mounting bracket (line II in FIG. 1)
Figure 10:
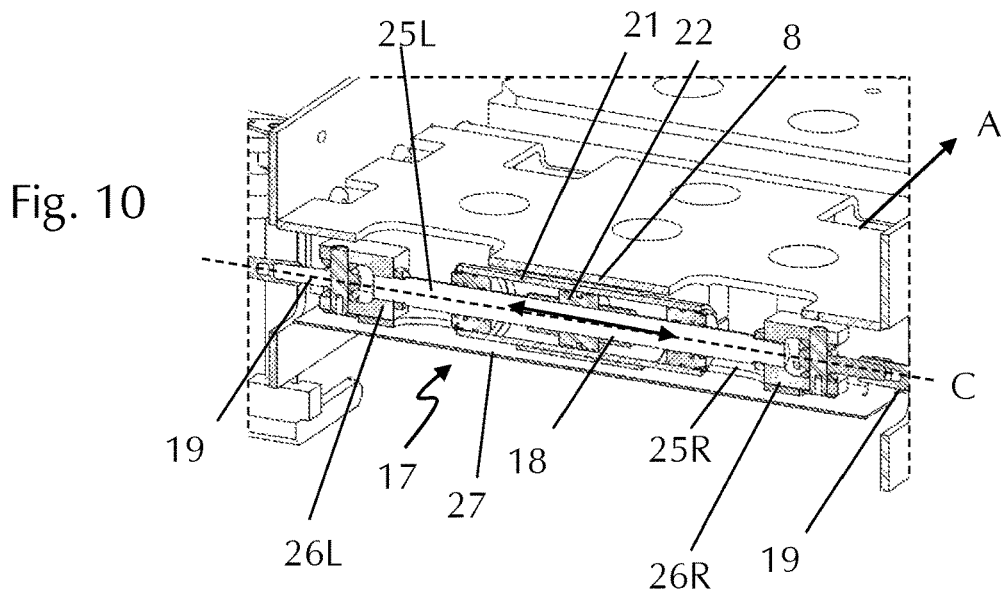
FIG. 10 is a perspective, vertical cross-sectional view along the adjustment axis of the control element (line I in FIG. 1)

It is possible that the machine frame comprises only one steerable wheel on either side thereof. In this case, the steerable wheel can be mounted directly to the machine frame 8 via a pivot structure that is pivotable about the vertical steering axis. However, the present embodiment shows a so-called tandem axle arrangement. The major components of this arrangement are a tandem axle frame 36, a tandem axle 37 (only indicated in FIG. 2) and a forced coupling 38 between the two wheels mounted on the axle frame 36 (e.g. wheels 13R and 14R on axle frame 36R). Both wheels of a tandem axle frame 36 are steerable about a vertical steering axis, all steering axes being parallel to each other. The steering system as disclosed above is respectively connected to one of the two wheels on each side (wheel 14R and wheel 14L). The further wheels 13R and 13L are respectively connected to this arrangement via the forced coupling 38 which comprises a coupling rod 39 (FIG. 8).

For the sake of clarity, the rubber parts of the wheels 13 and 14 are omitted in FIGS. 7 to 10 and 13.

What is claimed is:

1. A construction machine comprising:
   an engine;
   a machine frame;
   a pair of front wheels with at least one right-side front wheel and at least one left-side front wheel in the forward direction of the construction machine, each front wheel being steerable about a separate vertical steering axis;
   a steering structure connected to the front wheels for driving and coordinating the steering movement of the front wheels about the vertical steering axes, the steering structure comprising:
      a steering actuator mounted on the machine frame and comprising a driven control member that is linearly moveable in a horizontal plane and perpendicular to the forward direction along an adjustment axis in relation to the machine frame, the driven control member comprising link elements at each end on its right and left side with regard to the forward direction of the construction machine, wherein:
         the link elements are part of link joints of steering linkages in functional connection with the front wheels for steering purposes;
         the link elements of the control member are rigidly connected with each other by a connecting/fastening element that is independent from the control member;
         the connecting/fastening element is part of an anti-rotation structure that inhibits a rotational movement of the link elements about the adjustment axis in relation to each other and to the machine frame and thus fixates the rotational position of the link elements about the adjustment axis in relation to the machine frame and to each other;
   wherein the right-side front wheel and the left-side front wheel are each part of a tandem axle arrangement, each tandem axle arrangement comprising a tandem axle frame supporting a first and second left-side front wheel and a first and second right-side front wheel, wherein each tandem axle frame is connected to the machine frame via a horizontal tandem axle and each front wheel is steerable around an individual vertical steering axis; and
   wherein the first and the second left-side front wheels are connected with each other with a forced coupling comprising a steering rod and that the first and the second right-side front wheels are connected with each other with a forced coupling comprising a further steering rod and that the wheels on each side are mechanically arranged in series with regard to the transmittal of the steering forces exerted by the steering actuator via the respective steering rods.

2. The construction machine according to claim 1, wherein the steering actuator is a hydraulic cylinder, wherein a cylinder barrel is stationary relative to the machine frame and the control member is a cylinder piston with a left and a right cylinder rod end protruding from the cylinder piston.

3. The construction machine according to claim 1, wherein the anti-rotation structure comprises at least one form closure element that is stationary relative to the frame and that engages with a complementary form closure element that is stationary relative to the link elements.

4. The construction machine according to claim 3, wherein the form closure element is connected to the steering actuator or the machine frame and that the complementary form closure element is connected to at least one link element or to the connecting/fastening element or is constituted by the connecting/fastening element.

5. The construction machine according to claim 3, wherein the guiding element of the linear guidance structure is the form closure element of the anti-rotation structure and the engagement element of the linear guidance structure is the complementary form closure element of the anti-rotation structure.

6. The construction machine according to claim 1, wherein the anti-rotation structure comprises a linear guidance structure that permits linear movement of the connecting/fastening element in relation to at least a part of the steering actuator that is stationary with regard to the machine frame.

7. The construction machine according to claim 6, wherein the linear guidance structure of the anti-rotation structure comprises:
   a guiding element that extends in the direction of the adjustment axis of the control member, an elongated hole or a rail; and
   an engagement element protruding in a radial direction of the adjustment axis that engages with the guiding element, an engagement pin.

8. The construction machine according to claim 7, wherein the engagement pin comprises:
   a stop element that overlaps with the guiding element at least partially in a direction perpendicular to the radial direction of the adjustment axis on one side of the guiding element so that it prevents a movement of the guiding element in relation to the engagement element in at least one radial direction; and/or
   a stop element that overlaps with the guiding element at least partially in a direction perpendicular to the radial direction of the adjustment axis on the other side of the guiding element so that it prevents the movement of the guiding element in relation to the engagement element in at least the other radial direction; and/or
   the two stop elements being located in front and behind the guiding element in radial direction to the adjustment axis.

9. The construction machine according to claim 7, wherein the engagement pin comprises at least one of the following features:
   a base pin with a head portion and a base portion, wherein the base portion is connected in a stationary manner in relation to either the machine frame or the connecting/fastening element, and wherein the head portion comprises the stop element; and/or a base pin with a head portion and a base portion, wherein the base portion is connected in a stationary manner in relation to either the machine frame or the connecting/fastening element and the head portion comprises an attachment portion for the attachment of a head pin, wherein the head pin is attached to the head portion, comprises a shaft portion that runs through the guiding element and further comprises a stop element on the side of the guiding element that is opposite the base pin.

10. The construction machine according to claim 1, wherein the connecting/fastening element comprises at least one of the following features:
   it is a plate-like element;
   it is a solid, single-piece element;
   it is attached to the link members in a detachable manner via screw connections;
   the screw connections are accessible from the underside of the construction machine;
   it extends parallel to the steering actuator and in the direction of the adjustment axis;
   it is positioned below the steering actuator; and/or
   the link elements are forked joints and the connecting/fastening element is attached directly to these forked joints.

11. The construction machine according to claim 1, wherein the link elements are forked joints that are fastened to the end of the left and right cylinder rod ends protruding from the cylinder barrel and that the connecting/fastening element fastener is attached directly to these forked joints.

12. The construction machine according to claim 1, wherein a detachable ground protection shield is mounted on the frame below the steering actuator and/or below its link members and that shields the steering actuator and/or its link members on the ground side.

13. The construction machine according to claim 1, wherein the construction machine is a paving material handling machine, a paver or a material transfer vehicle.

* * * * *